(12) United States Patent
Bhavsar et al.

(10) Patent No.: US 11,538,256 B2
(45) Date of Patent: Dec. 27, 2022

(54) SYSTEMS AND METHODS FOR DATA COLLECTION AND PERFORMANCE MONITORING OF TRANSPORTATION INFRASTRUCTURE

(71) Applicant: Rowan University, Glassboro, NJ (US)

(72) Inventors: Parth Bhavsar, Glassboro, NJ (US); Nidhal Bouaynaya, Glassboro, NJ (US); Yusuf Mehta, Glassboro, NJ (US); Mashrur Chowdhury, Clemson, SC (US)

(73) Assignee: Rowan University, Glassboro, NJ (US)

( * ) Notice: Subject to any disclaimer, the term of this patent is extended or adjusted under 35 U.S.C. 154(b) by 0 days.

(21) Appl. No.: 16/643,999

(22) PCT Filed: Sep. 12, 2018

(86) PCT No.: PCT/US2018/050582
§ 371 (c)(1),
(2) Date: Mar. 3, 2020

(87) PCT Pub. No.: WO2019/055465
PCT Pub. Date: Mar. 21, 2019

(65) Prior Publication Data
US 2021/0064887 A1 Mar. 4, 2021

Related U.S. Application Data

(60) Provisional application No. 62/613,958, filed on Jan. 5, 2018, provisional application No. 62/557,569, filed on Sep. 12, 2017.

(51) Int. Cl.
*G06V 20/58* (2022.01)
*G06K 9/62* (2022.01)
(Continued)

(52) U.S. Cl.
CPC ......... *G06V 20/588* (2022.01); *G06K 9/6256* (2013.01); *G06K 9/6276* (2013.01);
(Continued)

(58) Field of Classification Search
USPC ...................................................... 348/148
See application file for complete search history.

(56) References Cited

U.S. PATENT DOCUMENTS

| 4,821,426 A | 4/1989 | Angove |
| 6,266,442 B1 * | 7/2001 | Laumeyer .......... G06K 9/00818 382/104 |

(Continued)

FOREIGN PATENT DOCUMENTS

| DE | 102016224530 B3 | 1/2018 |
| GB | 2372315 A | 8/2002 |

(Continued)

OTHER PUBLICATIONS

Ames Engineering, 8300 Survey Pro High Speed Profiler, https://amesengineering.com/products/8300-survey-high-speed-texture-p . . . , downloaded Aug. 17, 2018, 3 pages.

(Continued)

*Primary Examiner* — Mikhail Itskovich
(74) *Attorney, Agent, or Firm* — Saul Ewing Arnstein & Lehr LLP; Domingos J. Silva; Brandon Newton

(57) ABSTRACT

The present invention provides a data collection system comprising: a camera; a location module; a plurality of sensors; and a first processor communicatively coupled to the camera and the location module, the first processor programmed to: obtain a plurality of frames from the camera; obtain a plurality of locations from the location module; obtain a plurality of data measurements from the plurality of sensors; apply a previously trained first neural network model for identifying problematic road segments to frames captured by the camera; and if the first neural network model indicates that a frame is a problematic road segment, save the frame in association with a location provided by the location module.

17 Claims, 5 Drawing Sheets

(51) Int. Cl.
    G06N 3/02       (2006.01)
    G06V 20/56      (2022.01)
    G06T 7/00       (2017.01)
    G06V 20/40      (2022.01)
(52) U.S. Cl.
    CPC ............. *G06N 3/02* (2013.01); *G06T 7/0006*
        (2013.01); *G06T 7/0008* (2013.01); *G06V*
        *20/46* (2022.01); *G06T 2207/20084* (2013.01)

(56) References Cited

U.S. PATENT DOCUMENTS

| | | |
|---|---|---|
| 6,615,648 B1 | 9/2003 | Ferguson et al. |
| 2009/0097038 A1 | 4/2009 | Higgins-Luthman et al. |
| 2014/0195112 A1 | 7/2014 | Lu et al. |
| 2014/0355839 A1 | 12/2014 | Bridgers et al. |
| 2016/0054452 A1 | 2/2016 | Cosatto et al. |
| 2017/0213084 A1 | 7/2017 | Akselrod et al. |
| 2017/0243370 A1 | 8/2017 | Hoye et al. |

FOREIGN PATENT DOCUMENTS

| | | |
|---|---|---|
| GB | 2542118 A | 3/2017 |
| WO | 2016124487 A1 | 8/2016 |

OTHER PUBLICATIONS

International Search Report and Written Opinion, International Patent Application No. PCT/US2018/050582, dated Dec. 17, 2018.

University Transportation Research Center Presents 2016 Transport-Tech Summit, In the Proceedings of the Transportation Technology Symposium New York, New York, Nov. 15, 2016, 40 pages.

Wikipedia, k-nearest neighbors algorithm, https://en.wikipedia.org/wiki/K-nearest_neighbors_algorithm, downloaded Sep. 7, 2018, 10 pages.

Bhavsar, P. , et al., "Framework for Utilization of Mobile Data Collection", NJDOT—Transportations Systems Management, "Improving Lives by Improving Mobility", 35 pages, Nov. 15, 2016.

Jo, Y. , et al., "Pothole Detection System Using a Black-box Camera", Sensors 15, 2015, 29316-29331.

Jo, Y. , et al., "Pothole Detection Using Android Smartphone with a Video Camera", Journal of Emerging Trends in Computing and Information Sciences, vol. 8, No. 1, Jan. 2017, 25-29.

Karmel, A. , et al., "Machine Learning Based Approach For Pothole Detection", International Journal of Civil Engineering and Technology (IJCIET), vol. 9, Issue 5, May 2018, 882-888.

Koch, C. , et al., "Pothole detection in asphalt pavement images", Advanced Engineering Informatics 25, 2011, 507-515.

Luong, N. C., et al., "Data Collection and Wireless Communication in Internet of Things (IoT) Using Economic Analysis and Pricing Models: A Survey", Computer Science and Game Theory, Aug. 11, 2016, 45 pages.

Wilson, D. , "Cameras scan the highways for potholes", Vision Systems Design, Vision and Automation Solutions For Engineers And Integrators Worldwide, Apr. 4, 2012, 2 pages.

* cited by examiner

SYSTEMS AND METHODS FOR DATA COLLECTION AND PERFORMANCE MONITORING OF TRANSPORTATION INFRASTRUCTURE

CROSS-REFERENCE TO RELATED APPLICATIONS

This application is a national phase application under 35 U.S.C. 371 of International Application No. PCT/US2018/050582, filed Sep. 12, 2018, which claims the benefit of priority to U.S. Provisional Patent Application Ser. No. 62/557,569, filed Sep. 12, 2017, and U.S. Provisional Patent Application Ser. No. 62/613,958, filed Jan. 5, 2018, the contents of which are incorporated by reference herein in their entirety.

BACKGROUND OF THE INVENTION

The most recent infrastructure report card from American Society of Civil Engineers (ASCE), gave the grade of D+ to the U.S. infrastructure and estimated that $3.6 trillion are required to improve infrastructure conditions by 2020. Furthermore, the road users receive an unacceptably rough ride on about 32% of interstates, freeways, and other arterial routes due to their poor surface conditions. Specifically, potholes, which form progressively due to poor pavement conditions, may result in additional loss of resources and decrease safety of the roadway. Failing to repair potholes was considered one of the primary reasons for more than 3400 crashes involving cyclists in United Kingdom in the year 2015. These poor road conditions also lead to traffic congestion that impacts quality of life. In the US, potholes were the most common cause of tort claims in South Carolina. One of the solutions is to utilize innovative yet affordable data collection, processing and analytics technologies to resolve these issues. The present invention addresses such solutions.

SUMMARY OF THE INVENTION

In certain aspects, the present invention provides a data collection system having: a camera; a location module; a plurality of sensors; and a first processor communicatively coupled to the camera and the location module. The first processor can be programmed to: obtain a plurality of frames from the camera; obtain a plurality of locations from the location module;
obtain a plurality of data measurements from the plurality of sensors; apply a previously trained first neural network model for identifying problematic road segments to frames captured by the camera; and if the first neural network model indicates that a frame is a problematic road segment, save the frame in association with a location provided by the location module.

In some embodiments, the camera, the location module, and the first processor are all located within a housing within a single motor vehicle. In some embodiments, the camera obtains at least one frame before detection of a problematic road segment, at least one frame containing a detected problematic road segment, and at least one frame after detection of a problematic road segment.

In some embodiments, the system further includes a second processor located remotely from, but communicatively coupled to the first processor. The second processor can be programmed to: load the frames saved by the first processor; apply a previously trained second neural network model for identifying specific road problems to frames captured by the camera; and save at least those outputs of the second neural network model associated with one of the specific road problems in association with at least the location associated with the frame. In some embodiments, the specific road problems include one or more of: potholes, cracks, pavement markings, manholes, debris, objects, and other pavement inconsistencies. In some embodiments, the cracks include one or more of: fatigue cracks, alligator cracks, block cracking, edge cracking, longitudinal cracking, transverse cracking, reflective cracking, slippage cracking, and faulting. In some embodiments, the pavement markings may include one or more standard markings such as arrows, stop bar, cross-walk, or any other according the national, state and/or local government standards, and irregular markings such as squiggles, graffiti, various types of markings due to maintenance/construction and any other markings that is not according the national, state and/or local government standards. In some embodiments, the other pavement inconsistences include one or more of: corrugation, shoving, protrusions, depressions, raveling, rutting, water bleeding, and stripping. In some embodiments, the potholes may include small potholes, medium potholes, and large potholes.

In some embodiments, the camera has a frame rate of about 60 frames per second. In some embodiments, the frames relate to an area having dimensions including a width and a length between about 3 meters and about 4 meters.

In some embodiments, the plurality of sensors are programmed to measure environmental conditions and/or pavement conditions. In some embodiments, the plurality of sensors may include one or more of: traffic sensors, temperature sensors, and humidity sensors.

In certain aspects, the present invention provides a method for identifying a defect in a roadway. The method includes: (a) positioning the system as described herein on a motor vehicle; (b) automatically acquiring frames from the camera; and (c) automatically processing the frames using the first processor to identify one or more problematic road segments. The method may further include (d) transmitting the one or more frames associated with the one or more problematic road segments to a second processor located remotely from, but communicatively coupled to the first processor, wherein the second processor is programmed to: load the frames saved by the first processor; apply a previously trained second neural network model for identifying specific road problems to frames captured by the camera; and save at least those outputs of the second neural network model associated with one of the specific road problems in association with at least the location associated with the frame; automatically processing the loaded frames using the second processor; and classifying the specific road problems as one or more classifications of potholes, classifications of cracks or classifications of irregular markings. In some embodiments, the system further includes a plurality of sensors. In some embodiments, the plurality of sensors include one or more selected from the group consisting of: temperature sensors and humidity sensors.

In some embodiments, the method further includes: (e) assigning one or more temperature and/or humidity measurements to the classified road problem with an associated location.

In some embodiments, the frames undergo preprocessing before they are processed by the first processor. In some embodiments, the preprocessing includes one or more of: cropping, thresholding, and grayscaling. In some embodiments, the frames do not undergo preprocessing before they are processed by the first processor.

BRIEF DESCRIPTION OF THE DRAWINGS

The following detailed description of specific embodiments of the invention will be better understood when read in conjunction with the appended drawings. For the purpose of illustrating the invention, exemplary embodiments are shown in the drawings. It should be understood, however, that the invention is not limited to the precise arrangements and instrumentalities of the embodiments shown in the drawings.

DETAILED DESCRIPTION OF THE INVENTION

The present invention provides systems and methods for data collection

Definitions

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, specific materials and methods are described herein. In describing and claiming the present invention, the following terminology will be used.

It is also to be understood that the terminology used herein is for the purpose of describing particular embodiments only, and is not intended to be limiting.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

Mobile Data Collection Systems

System Architecture

Figure 1:
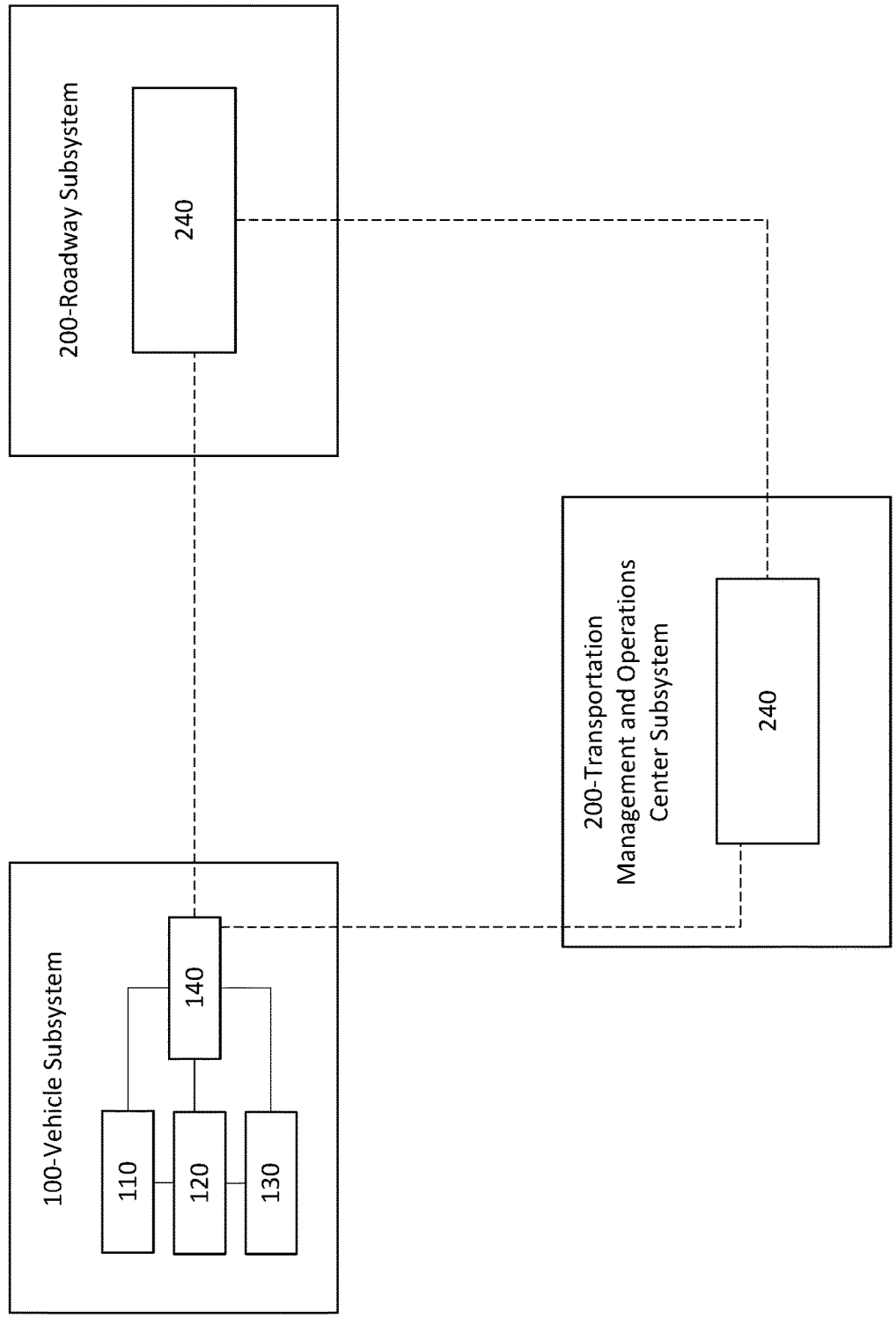
FIG. 1 depicts a diagram of an exemplary system architecture of the present invention.

The present invention provides roadway performance monitoring systems for identifying and characterizing roadway features in a cost-effective manner. Embodiments of the system of the present invention may include one or more cameras, one or more sensors, one or more location modules, and a first processor coupled to the sensors, location module and to the camera. The system, as depicted in FIG. 1, may include one or more second processors in remote communication with the first processor. The second processor may be located, for example, at a stationary roadside substation, a traffic management and operations center substation, "in the cloud", and/or both.

Referring now to FIG. 1, embodiments of the system may include one or more first units 100 that are positioned on a motor vehicle. Embodiments of the first unit 100 may include one or more components including one or more cameras 110, one or more sensors 120, one or more location modules 130, and one or more first processors 140. First unit 100 may include none, one or more than one of each of the one or more components, in any combination. For example, in some embodiments, first unit 100 may include no cameras 110. Embodiments of the first unit 100 can be encased in a housing that contains any combination of each of the components. For example, first unit 100 may be encased in a housing that contains one or more camera 110, sensors 120, location module 130, and first processor 140. The housing may be constructed from any suitable material, for example, non-corrosive materials such as polymers. In some embodiments, the housing may be constructed from electrically non-conducting material. Embodiments of the first unit 100 may include one or more cameras 110, one or more sensors 120, one or more location modules 130, and one or more first processors 140 located on a single motor vehicle but optionally positioned in distinct locations in and/or on the motor vehicle in order to optimize operation of each component. For example, one or more cameras 110 may be positioned on the rear of the motor vehicle, on the roof of the motor vehicle, on one or more sides of the motor vehicle, and the like. Embodiments of the first unit 100 may include one or more one or more cameras 110, one or more sensors 120, one or more location modules 130, and one or more first processors 140 positioned in or on adjacent vehicles. In some embodiments, each of the one or more cameras 110, one or more sensors 120, one or more location modules 130 are in communication with the one or more first processors 140. In some embodiments, the components of first unit 100 are connected to the one or more first processors 140 using direct connections such as Ethernet, for example, or using wireless means including, for example WI-FI®, Bluetooth®, LTE, DSRC or other suitable communication protocol.

Embodiments of the one or more cameras 110 may include one or more suitable cameras as understood in the art. For example, the one or more cameras may include one or more digital cameras, one or more high-definition cameras, and the like. The camera may have a frame rate suitable to obtain a sufficient number of images from a moving vehicle in order to detect one or more problematic road segments along a roadway of interest. For example, the camera may have a frame rate of about 60 frames per second (fps). The camera may be positioned and/or adjusted in order to obtain a frame having a field-of-view width sufficiently wide to obtain an image the width of an entire lane of traffic. For example, the camera may have a field-of-view width of about of about three (3) meters. The field of view may have a width of up to about three meters. The field of view may have a width of at least about three meters. The camera may be positioned and/or adjusted in order to obtain a frame having a field-of-view length of about four (4) meters. The field of view may have width of up to about four meters. The field of view may have a width of at least about four meters.

Embodiments of the one or more sensors 120 may include one or more additional cameras, environmental sensors, traffic detection sensors, and the like. For example, the one or more environmental sensors may include one or more temperature sensors, humidity sensors, barometric pressure sensors, and the like. The one or more temperature and humidity sensors may include one or more infrared thermometer sensors, microprocessors, transceivers and the like. The one or more environmental sensors may be positioned and/or programmed to measure ambient air and/or atmospheric conditions, pavements conditions, and the like. The one or more sensors may include one or more motion-sensing input devices, light detection and ranging (LIDAR) sensors, other laser-based sensors, radio detection and ranging (RADAR) sensors, acoustic wave-based sensors, and the like, for detecting, for example traffic including moving vehicles, stationary vehicles, and the like. The one or more sensors are suitable for obtaining measurements from a moving vehicle, a stationary vehicle, or both a moving and stationary vehicle.

Embodiments of the one or more location modules 130 may include for example one or more global positioning system (GPS) modules, and the like for determining the location of the mobile first unit of the system of the present invention. The one or more location modules 130 can also communicate with another device such as a smart phone, a navigation system, and the like to determine a location. Additionally, various non-GPS location methods are described in International Publication Nos. WO 2011/011405 and WO 2012/012550.

Embodiments of the first processor 140 may include a processor can be programmed to identify one or more problematic road segments. For example, embodiments of the first processor may include one or more processors programmed to differentiate between good road segment frames and bad road segment frames obtained from camera 110. First processor 140 may be programmed using one or more machine learning algorithms, for example one or more convolutional neural network models including K-nearest neighbor algorithms, or one or more similar approaches. First processor 140 may be programmed to define the one or more bad road segments as segments having one or more features including, for example, one or more potholes, cracks manholes, pavement markings, debris, other pavement defects or inconsistencies, and the like. First processor 140 may also be programmed to assign location data from location modules 130 to frames containing one or more features associated with one or more bad road segments. First processor may be programmed to assign priority (e.g., for processing, communication, and the like) to identified features. For example, the pothole detection data can be assigned low priority compared to traffic count. First processor may be programmed to assign location information, environmental condition information, and traffic information to each frame identified.

First processor 140 may include one or more modules for remotely communicating to one or more second processors 240. For example, first processor 140 may include one or more communication means including, for example, one or more signal transmitters for communicating via WI-FI®, long-term evolution (LTE), delicate short-range communications (DSRC), or other suitable communication protocols. First processor 140 may include local data storage means such as, for example one or more local digital data storage mediums, analog data storage mediums and the like. In some embodiments, data collected from one or more cameras 110 and/or more sensors 120 is stored locally and can be physically transmitted to a second processor using physical data storage and/or data transferring means as understood in the art.

Referring again to FIG. 1, embodiments of the system can include a second unit comprising one or more second processors. The one or more second processors 240 may be located remotely from, but communicatively coupled to first processor 140. Second processor 240 may be coupled to first processor 140 by way of one or more communication means including, for example, one or more signal receivers for communicating with first processor 140 via WI-FI®, LTE, delicate short-range communications (DSRC), other communication protocols, and the like. Second processor 240 may include means for physically receiving data transferred from first processor 140. For example, the second processor 240 can include or be communicatively coupled with memory and/or storage to receive frames, location data, and/or other information processed by the first processor 140.

The one or more second units 200 may be positioned at one or more roadway substations, at one or more traffic management centers, in a data center, "in the cloud", and the like. Each of the one or more second units 200 can be in remote communication with first unit 100 and/or with each other. The one or more second processors 240 that are a part of second unit 200 may be programmed to perform specific tasks including, for example, loading the one or more frames saved by the first processor, applying a previously trained second neural network model for identifying specific road problems to frames captured by the camera; and saving at least those outputs of the second neural network model associated with one of the specific road problems in association with at least the location associated with the frame. Second processor 240 be programmed using one or more machine learning algorithms, for example, one or more convolutional neural network models, or one or more similar object detection and classification approaches. Embodiments of second processor 240 can be programmed to categorize the one or more bad road segments identified by first processor 140 to have one or more features including potholes, cracks, irregular pavement markings, other pavement defects and the like. Second processor 240 may be programmed to categorize one or more identified cracks as a fatigue cracks, alligator cracks, block cracking, edge cracking, longitudinal cracking, transverse cracking, reflective cracking, slippage cracking, faulting, and the like. Embodiments of second processor may be programmed to categorize one or more identified potholes as a small, medium or large pothole. For example, a small pothole may include a pothole having a depth at its deepest point of up to about 25 mm. A medium pothole may include a pothole having a depth of about 25 mm to up to about 50 mm. A large pothole may include a pothole having a depth greater than about 50 mm. Second processor may be programmed to categorize one or more identified irregular pavement markings as standard markings or irregular markings. Standard markings may include, for example, arrows, stop bars, cross-walks, or any other markings according the national, state and/or local government standards, and the like. Irregular markings may include, for example, missing paint, extraneous paint, unrecognized and/or mismatched signage, squiggles, graffiti, various types of markings due to maintenance/construction and/or any other markings that are not according the national, state and/or local government standards. Second processor may be programmed to categorize one or more identified other pavement defects as corrugation, shoving, depressions, protrusion, raveling, rutting, water bleeding, stripping, and the like.

Methods

Figure 2:
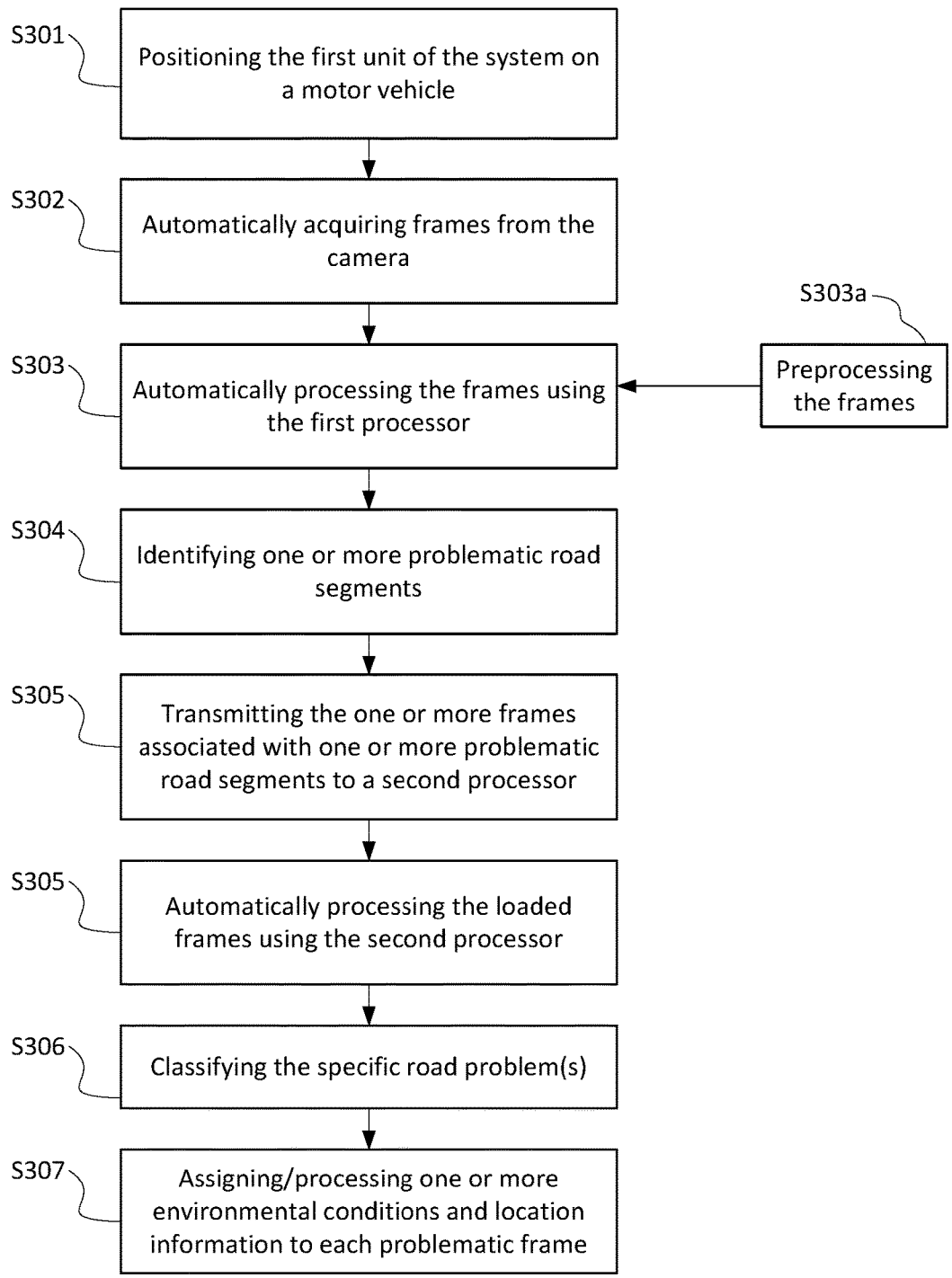
FIG. 2 depicts an exemplary method of the present invention.

The present invention further provide methods 300 for identifying a defect in a roadway, shown in FIG. 2.

Figure 4:
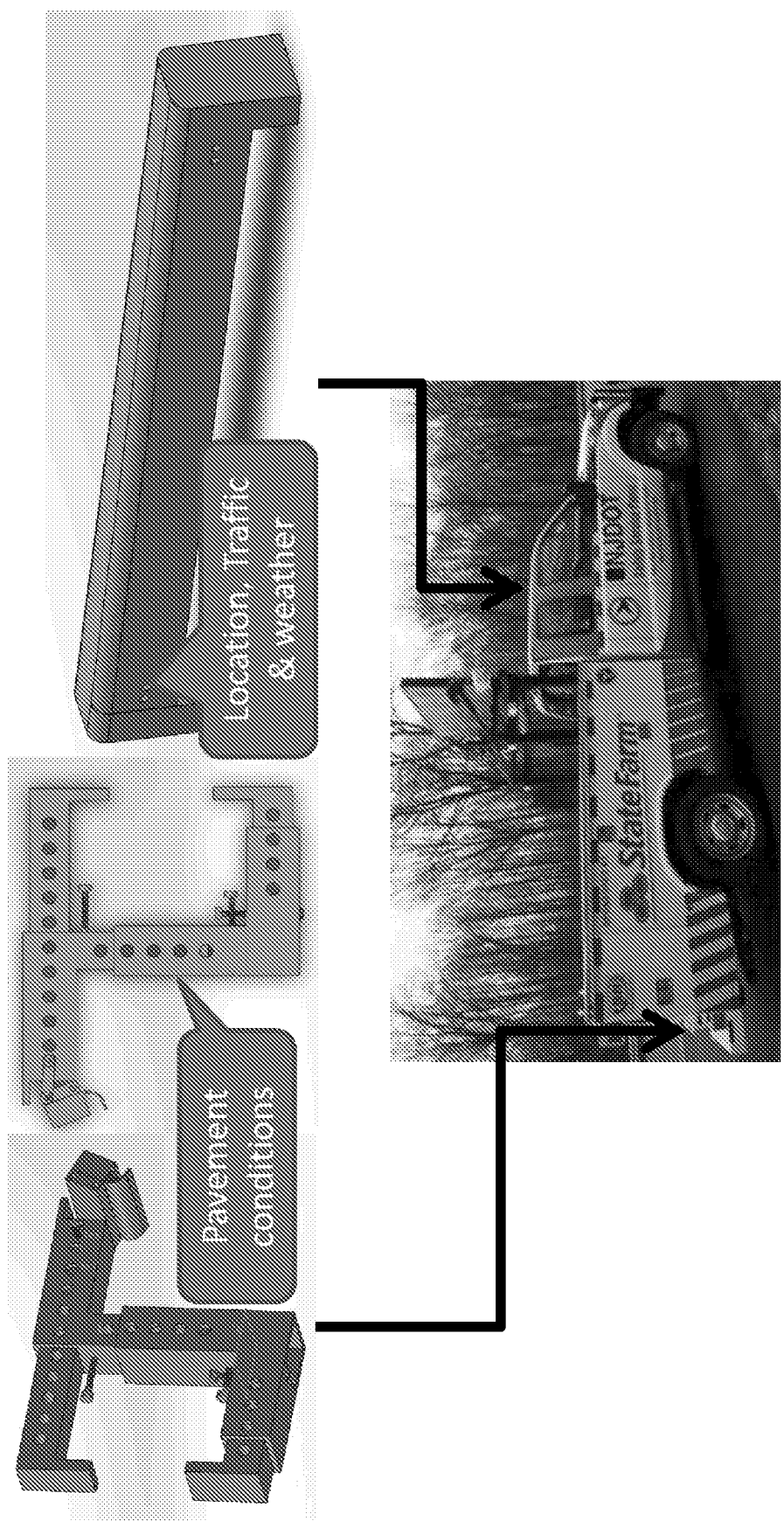
FIG. 4 depicts exemplary positioning of sensors of the first unit of invention as described herein. While they are performing other tasks, the system can collect data as needed.

Referring now to FIG. 2, step S301 of method 300 may include positioning the first unit of the system of the present invention on a motor vehicle. First unit 100 may be positioned, in whole or in part, for example, in a specialized hitch on the rear of a motor vehicle. In other embodiments, the first unit 100 is permanently or removably mounted (e.g., with mechanical fasteners, magnets, clamps, adhesives, and the like) to a portion of the motor vehicle such as the bumper, chassis, and the like. For example, as depicted in FIG. 4, first unit 100 may be mounted using a bracket, and the various components of first unit 100 may be located on different positions of a motor vehicle. An exemplary schematic of the mounting of Embodiments of first unit 100 can be positioned on either the right side or left side of the rear of a motor vehicle in order to capture roadway signals from the behind the motor vehicle in addition to from one or more sides of the motor vehicle. In some embodiments, the one or more camera and one or more sensors may be placed on the backside of a motor vehicle while traffic sensors and other sensors may be positioned on a side of the vehicle. The one or more processors may be physically adjacent to the one or more cameras and/or sensors or may be positioned in a separate location within or on the motor vehicle and may be in remote communication with the cameras, sensors, location modules, and the like, paired using remote communication means including for example WI-FI®, Bluetooth®, LTE, DSRC and the like. Other components of the first unit 100 can be placed within or in other locations on the motor vehicle. For example, one or more components such as a first processor 140, location module 130, a storage device, a power source, and the like, can be within a housing that can be removably placed within the motor vehicle and paired to camera 110 and other components. In such an example, the processor-containing housing can be used across multiple vehicles, which may each have a first unit 100, and/or any one or all of the components of first unit 100 including for example none, one or more than one mounted cameras 110, sensors 120, location modules 130, first processors 140 or any combination thereof.

Step S302 may include automatically acquiring frames from the camera 110. Embodiments of camera 110 can be programmed to automatically acquire images from a vehicle while in operation. For example, camera 110 may be programmed to continuously acquire frames at a frame rate of about 60 fps while the vehicle is in operation. Embodiments of camera 110 can be programmed to acquire frames at a faster or slower frame rate in order to acquire a frame for each length of roadway. Embodiments of camera 110 may acquire frames at a faster or slower rate based on the speed of the vehicle to which camera 110 may be attached. For example camera 110 may have a faster frame rate as the vehicle moves faster and may have a slower frame rate as the vehicle moves slower. Embodiments of camera 110 may include auto-focus and auto-contrast settings. Embodiments of step S302 include optionally manually acquiring images at user-determined intervals.

Step S303 may include automatically processing the frames using the first processor to identify one or more problematic road segments. For example, first processor may automatically process frames acquired from camera 110 to differentiate between frames containing good road segments and frames containing bad or problematic road segments. Embodiments of step S303 may include storing frames determined to contain bad road segments. For example, step S303 may include processing and storing at least three (3) frames for each segment identified as a bad or problematic road segment. That is, one or more frames immediately before the frame containing the bad road segment, one or more frames including the bad road segment, and one or more frames immediately after the bad road segment may be stored. Frames may optionally be manually processed to manually identify one or more problematic road segments. Embodiments of method 300 may include a step S303 a wherein the frames undergo preprocessing before they are processed by the first processor. The preprocessing may include, for example cropping out non-road features such as cars, landscape, animals, vehicles, and the like. Preprocessing images and/or frames may also include thresholding, grayscaling, and the like. Embodiments of step S303 include assigning location information, ambient environmental conditions, and/or roadway environmental conditions and the like to each stored frame including frames containing bad or problematic road segments and, in some embodiments, frames adjacent to those frames.

Step S304 may include transmitting the one or more frames associated with the one or more problematic road segments to second processor 240 located remotely from, but communicatively coupled to first processor 140. In embodiments of step S304, second processor 240 may be programmed to: 1) load the frames saved by the first processor; 2) apply a previously trained second neural network model for identifying specific road problems to frames captured by the camera; and 3) save at least those outputs of the second neural network model associated with one of the specific road problems in association with at least the location associated with the frame.

Step S305 may include automatically processing the loaded frames using the second processor. For example, Step S305 may include classifying the specific road problems as one or more classifications of potholes, classifications of cracks or classifications of irregular markings. Step S305 may include processing the one or more ambient environmental conditions, roadway environmental conditions and the like assigned to the classified road problem and associated with a location.

Kits

The invention further provides kits including the elements disclosed elsewhere herein. A set of instructional materials can also be provided in the kit. The instructional materials can contain written, pictorial, and/or video directions on using the materials of the kit, including the methods of the invention.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein.

Example 1: System Evaluation

Figure 3:
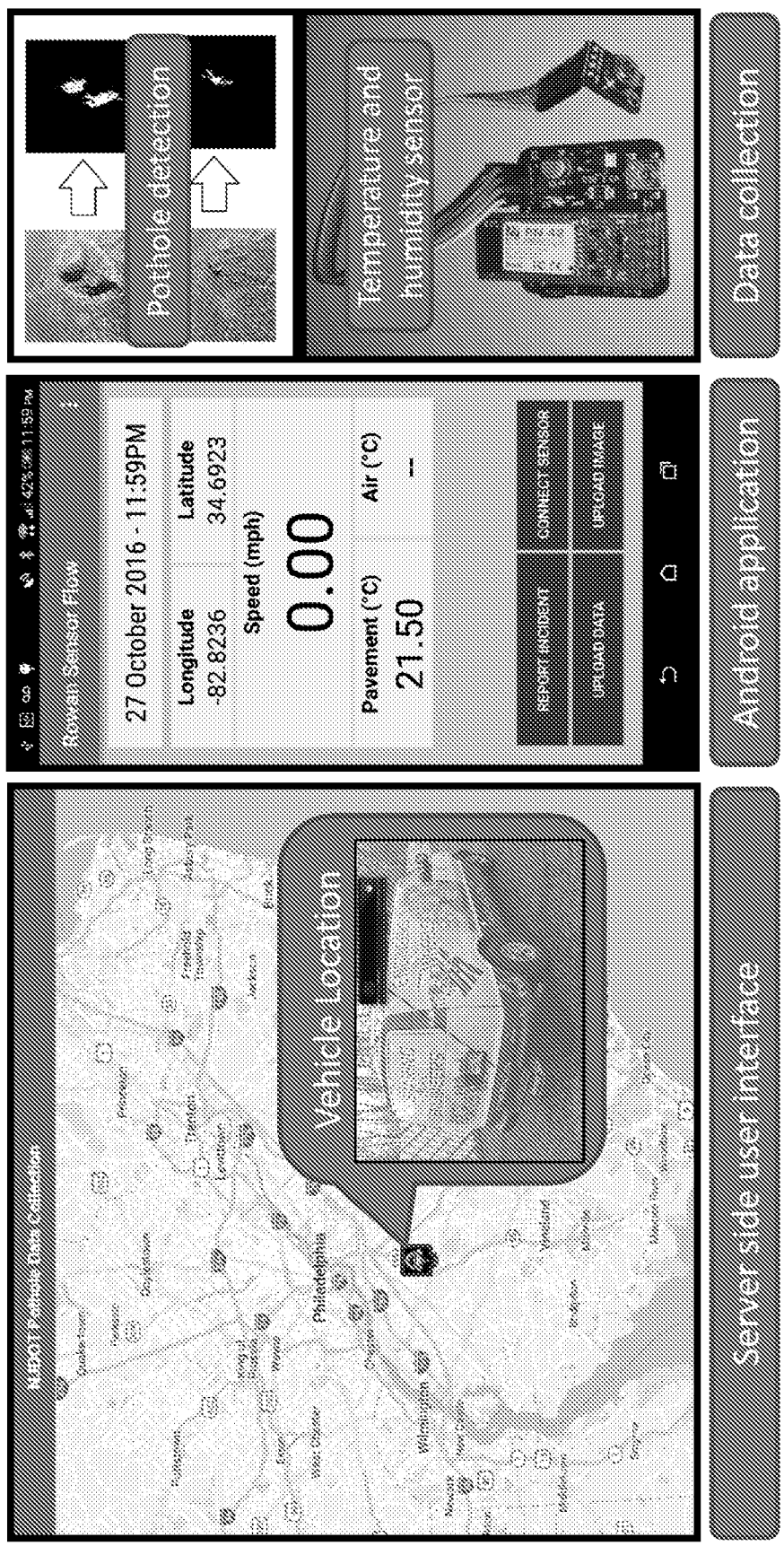
FIG. 3 depicts an exemplary prototype of the system of the present invention, as described herein.

The proof of principle prototype, shown in FIG. 3, developed for this project included a communication platform and a pothole detection sensor with an integrated temperature and humidity sensor. The system evaluation included multiple tests with the prototype to identify critical issues with the system. The research team improved the efficacy of the system with every iteration. The developed prototype was attached to the Rowan Engineers on Wheels Utility Van to evaluate the performance of the overall system. The data collection involved multiple trips in non-peak hour time of the day during Spring 2017. The routes of data collection were chosen to minimize number of turns and traffic signals. Further details about routes are provided in Table 1.

TABLE 1

|  | Total Images | Distance in miles (kilometers) | Duration in hours | Average Speed (mph) |
|---|---|---|---|---|
| Day 1 | 52461 | 16.9 (27.2) | 0.65 | 25.9 |
| Day 2 | 47973 | 14.9 (23.9) | 0.52 | 28.7 |
| Total | 100434 | 31.8 (51.18) | 1.17 | 27.3 |

Data analysis section included evaluation of algorithms. It is important to note that given the database of 100434 images, manual evaluation of each image requires significant amount of time and resources. Hence, the analysis included sample population 1600 images selected utilizing MATLAB® software. This subset was developed from 400 images per day (two days) and per algorithm (two algorithms). The 400 images were broken down into 200 from what was classified as 'bad road' and 200 from what was classified as 'good road'. Each set of the 400 images were randomly selected utilizing MATLAB® software. The performance measures of accuracy, specificity, and sensitivity were calculated by manually inspecting these images. The clarification of these performance measures is provided below.

True positive (TP)=The number of images correctly classified as potholes

False positive (FP)=The number of images misclassified as pothole

True negative (TN)=The number of images classified as good road

False negative (FN)=The number of images incorrectly classified as good road

The accuracy of the system is its ability to correctly identify bad portion of the road from the good portion. However, the best measurement depends on the ratio or proportion of bad road to good road. Mathematically, $$\text{Accuracy} = \frac{TP + TN}{TP + TN + FP + FN}.$$

The sensitivity of a system is its ability to determine actual bad roads. Mathematically, $$\text{Sensitivity} = \frac{TP}{TP + FN}.$$

Specificity is the system's ability to correctly classified good road. This takes the proportion of true negative as in $$\text{Specificity} = \frac{TN}{TN + FP}.$$

Results

Figure 5:
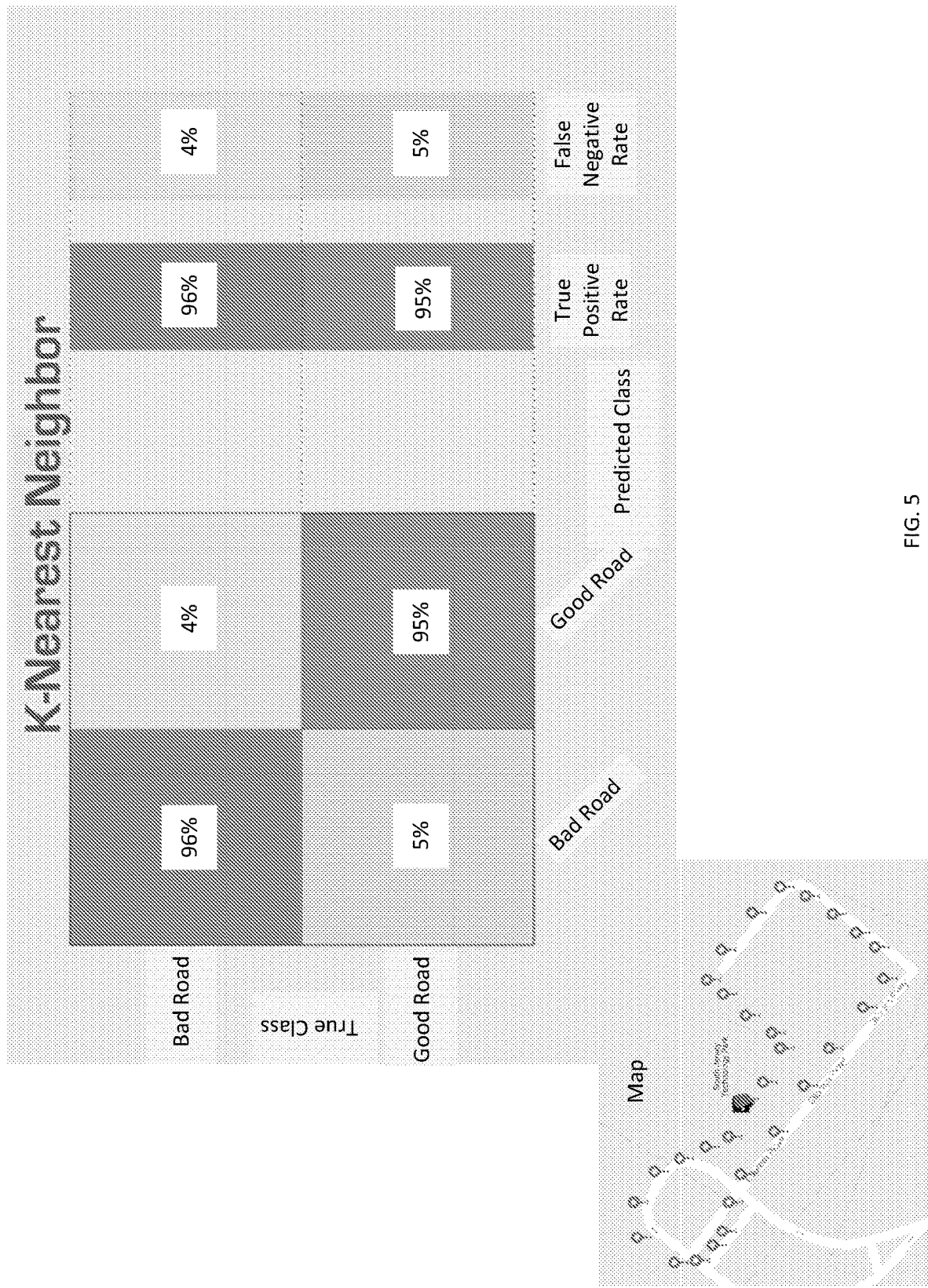
FIG. 5 depicts exemplary pothole location results computed using K-nearest neighbor analysis and an exemplary map indicating GPS locations.

The tabulated performance measures can be seen below in Table 2 and Table 3, and diagrammed in FIG. 5. The difference in Table 3 between KNN and SVM can be seen as negligible. The values are not significantly changing in any sort of a trend.

TABLE 2

| Algorithms | KNN | | | | SVM | | | |
|---|---|---|---|---|---|---|---|---|
|  | TP | FN | TN | FP | TP | FN | TN | FP |
| Day 1 | 49.50% | 6.50% | 93.50% | 50.50% | 60.50% | 7.00% | 93.00% | 39.50% |
| Day 2 | 58.50% | 7.50% | 92.50% | 41.50% | 47.00% | 7.00% | 93.00% | 53.00% |

For each algorithm, 400 total images were selected at random: 200 from pothole or 'positive' images and 200 from no pothole/clean road or 'negative' images.

The accuracy, sensitivity, and specificity of the algorithms can be seen below in Table 4. The evaluation resulted in about 73% accuracy, 88% sensitivity and 66% specificity. The system can be improved by preprocessing of images and improving the classifier algorithms. Furthermore, the performance can also be improved by implementing the results of this study as a feedback into the classifier algorithm.

TABLE 3

| Algorithms | KNN | | | SVM | | |
|---|---|---|---|---|---|---|
|  | Accuracy | Sensitivity | Specificity | Accuracy | Sensitivity | Specificity |
| Day 1 | 71.50% | 88.39% | 64.93% | 76.75% | 89.63% | 70.19% |
| Day 2 | 75.50% | 88.64% | 69.03% | 70.00% | 87.04% | 63.70% |
| Average | 73.50% | 88.52% | 66.98% | 73.38% | 88.34% | 66.95% |

Conclusions

The pothole detection unit described herein has the potential to significantly reduce cost of pavement data collection as well as improve the quality and size of the pavement data. Pavement condition inspection is an important task to maintain a sustainable, efficient and economic roadway system. The communication platform described herein provides a platform to integrate multiple data collection sensors for various applications. Furthermore, the automated pothole detection system developed in this project offers an efficient operational approach to aid surface repair and maintenance activity. Finally, the mobile data collection prototype is the first step towards developing location specific data sets that can significantly help optimize available resources by prioritizing future projects and improve the quality of data being used for various applications.

The system provides an affordable yet efficient solution for transitioning from conventional transportation system to connected & automated transportation system. With the evolution of vehicular technologies, higher resolution location specific data will be needed. The location specific data provided by this system can be utilized for various current and future TSM&O services without significant investment in data collection devices.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A data collection system comprising:
    a camera;
    a location module;
    a plurality of sensors, wherein the plurality of sensors are programmed to measure at least one of environmental conditions and pavement conditions, wherein the plurality of sensors include at least one of temperature sensors, humidity sensors, and barometric pressure sensors;
    a first processor communicatively coupled to the camera and the location module, the first processor programmed to:
        obtain a plurality of frames from the camera;
        obtain a plurality of locations from the location module;
        obtain a plurality of data measurements from the plurality of sensors;
        assign at least one of temperature measurements and humidity measurements to a classified road problem with an associated location;
        apply a previously trained first neural network model for identifying problematic road segments to at least one of frames captured by the camera and data measurements from the plurality of sensors;
        determine a frame of the plurality of frames contains a problematic road segment; and
        based on the determination, wirelessly transmit the frame containing the problematic road segment to a second processor; and
    the second processor statically located remotely from, but communicatively coupled to the first processor, the second processor programmed to:
        load the frame saved by the first processor;
        apply a previously trained second neural network model distinct from the first neural network model for identifying specific road problems to the frame captured by the camera;
        classifying at least one specific road problem depicted in the frame; and
        save at least those outputs of the second neural network model associated with one of the specific road problems in association with at least the location associated with the frame.

2. The data collection system of claim 1, wherein the camera, the location module, and the first processor are all located within a housing within a single motor vehicle.

3. The data collection system of claim 1, wherein the camera obtains at least one frame before detection of a problematic road segment, at least one frame containing a detected problematic road segment, and at least one frame after detection of a problematic road segment.

4. The data collection system of claim 1, wherein the specific road problems comprise one or more selected from the group consisting of: potholes, cracks, pavement markings, manholes, debris, objects, and other pavement inconsistencies.

5. The data collection system of claim 4, wherein the cracks comprise one or more selected from the group consisting of: fatigue cracks, alligator cracks, block cracking, edge cracking, longitudinal cracking, transverse cracking, reflective cracking, slippage cracking, and faulting.

6. The data collection system of claim 4, wherein the pavement markings comprise one or more selected from the group consisting of: government standard road markings and irregular markings.

7. The data collection system of claim 4, wherein the other pavement inconsistences comprise one or more selected from the group consisting of: corrugation, shoving, protrusions, depressions, raveling, rutting, water bleeding, and stripping.

8. The data collection system of claim 1, wherein the potholes comprise one or more selected from the group consisting of: small pothole, medium pothole, and large pothole.

9. The data collection system of claim 1, wherein the camera has a frame rate of about 60 frames per second.

10. The data collection system of claim 1, wherein the frames relate to an area having dimensions including a width and a length between about 3 meters and about 4 meters.

11. The data collection system of claim 1, wherein the temperature sensors include an infrared thermometer sensor.

12. A method for identifying a defect in a roadway by implementing the data collection system of claim 1, the method comprising:
    (a) positioning the data collection system on a motor vehicle;
    (b) automatically acquiring frames from the camera of the data collection system; and
    (c) automatically processing the frames using the first processor of the data collection system to identify one or more problematic road segments.

13. The method of claim 12, further comprising:
    (d) transmitting the one or more frames associated with the one or more problematic road segments to a second processor located remotely from, but communicatively coupled to the first processor, wherein the second processor is programmed to:
        load the frames saved by the first processor;
        apply a previously trained second neural network model for identifying specific road problems to frames captured by the camera; and save at least those outputs of the second neural network model associated with one of the specific road problems in association with at least the location associated with the frame;

automatically processing the loaded frames using the second processor; and classifying the specific road problems as one or more classifications of potholes, classifications of cracks or classifications of irregular markings.

14. The method of claim 13, wherein the plurality of sensors comprise one or more selected from the group consisting of: temperature sensors and humidity sensors.

15. The method of claim 13, further comprising:
(e) assigning one or more temperature and/or humidity measurements to the classified road problem with an associated location.

16. The method of claim 12, wherein the frames undergo preprocessing before they are processed by the first processor.

17. The method of claim 16, wherein the preprocessing comprises one or more selected from the group consisting of: cropping, thresholding, and grayscaling.

\* \* \* \* \*